US012466991B2

(12) United States Patent
Fernandez del Valle et al.

(10) Patent No.: US 12,466,991 B2
(45) Date of Patent: Nov. 11, 2025

(54) SINGLE-PHASE ALCOHOL-BASED RETARDED ACID

(71) Applicant: Schlumberger Technology Corporation, Sugar Land, TX (US)

(72) Inventors: Julia Fernandez del Valle, Doha (QA); Christopher Daeffler, Sugar Land, TX (US); Mohan Panga, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/577,787

(22) PCT Filed: Jul. 11, 2022

(86) PCT No.: PCT/US2022/036641
§ 371 (c)(1),
(2) Date: Jan. 9, 2024

(87) PCT Pub. No.: WO2023/283480
PCT Pub. Date: Jan. 12, 2023

(65) Prior Publication Data
US 2024/0309266 A1    Sep. 19, 2024

Related U.S. Application Data

(60) Provisional application No. 63/222,243, filed on Jul. 15, 2021, provisional application No. 63/219,970, filed on Jul. 9, 2021.

(51) Int. Cl.
*E21B 43/27* (2006.01)
*C09K 8/60* (2006.01)
*C09K 8/74* (2006.01)

(52) U.S. Cl.
CPC ............... *C09K 8/74* (2013.01); *C09K 8/602* (2013.01); *E21B 43/27* (2020.05)

(58) Field of Classification Search
CPC ............ C09K 8/74; C09K 8/602; E21B 43/27
See application file for complete search history.

(56) References Cited

U.S. PATENT DOCUMENTS

| | | |
|---|---|---|
| 2,485,529 A | 10/1949 | Cardwell |
| 3,681,240 A | 8/1972 | Fast |
| 3,826,312 A | 7/1974 | Richardson |
| 3,920,566 A | 11/1975 | Richardson |
| 4,140,640 A | 2/1979 | Scherubel |
| 4,368,136 A | 1/1983 | Murphey |
| 4,420,414 A | 12/1983 | Valone |
| 4,466,893 A | 8/1984 | Dill |
| 4,702,848 A | 10/1987 | Payne |
| 4,703,797 A | 11/1987 | Djabbarah |
| 4,730,676 A | 3/1988 | Luers |
| 4,807,703 A | 2/1989 | Jennings, Jr. |
| 5,120,471 A | 6/1992 | Jasinski |
| 5,220,960 A | 6/1993 | Totten |
| 5,310,002 A | 5/1994 | Blauch |
| 5,327,973 A | 7/1994 | Jennings, Jr. |
| 5,547,022 A | 8/1996 | Juprasert |
| 5,773,024 A | 6/1998 | Unger |
| 5,990,051 A | 11/1999 | Ischy |
| 6,117,364 A | 9/2000 | Vorderbruggen |
| 6,196,318 B1 | 3/2001 | Gong |
| 6,436,880 B1 | 8/2002 | Frenier |
| 7,148,184 B2 | 12/2006 | Francini |
| 7,237,608 B2 | 7/2007 | Fu |
| 7,350,572 B2 | 4/2008 | Fredd |
| 7,603,261 B2 | 10/2009 | Tardy |
| 7,615,516 B2 | 11/2009 | Yang |
| 7,635,028 B2 | 12/2009 | Li |
| 7,696,393 B2 | 4/2010 | Rivers |
| 7,774,183 B2 | 8/2010 | Tardy |
| 7,833,947 B1 * | 11/2010 | Kubala ............... C09K 8/70 166/305.1 |
| 7,915,205 B2 | 3/2011 | Smith |
| 8,163,102 B1 | 4/2012 | MacDonald |
| 8,551,926 B2 | 10/2013 | Huang |
| 8,580,047 B1 | 11/2013 | MacDonald |
| 8,940,106 B1 | 1/2015 | MacDonald |
| 9,034,806 B2 | 5/2015 | Gurmen |
| 9,085,975 B2 | 7/2015 | Abad |
| 9,376,611 B2 | 6/2016 | Berry |
| 9,573,808 B2 | 2/2017 | Jiang |
| 9,796,490 B2 | 10/2017 | Jiang |

(Continued)

FOREIGN PATENT DOCUMENTS

| | | |
|---|---|---|
| CN | 105349131 A | 2/2016 |
| CN | 105670599 | 6/2016 |

(Continued)

OTHER PUBLICATIONS

Al-Ghamdi, A. H.; Mahmoud, M. A.; Wang, G.; Hill, A. D.; Nasr-El-Din, H. A. "Acid Diversion by Use of Viscoelastic Surfactants: The Effects of Flow Rate and Initial Permeability Contrast." SPE 142564, Dec. 2014, SPE Journal, pp. 1203-1216.

Baker, B. D. et al., "Stimulation Practices Using Alcoholic Acidizing and Fracturing Fluids for Gas Reservoirs", SPE-4836-MS presented at the SPE European Spring Meeting, 1974, 7 pages.

Bonn, M.; Bakker, H. J.; Rago, G.; Pouzy, F.; Siekierzycka, J. R.; Brouwer, A. M.; Bonn, D. "Suppression of Proton Mobility by Hydrophobic Hydration" J. Am. Chem. Soc. 2009, 131, 17070-17071.

(Continued)

*Primary Examiner* — Silvana C Runyan

(74) *Attorney, Agent, or Firm* — Jeffrey D. Frantz

(57) ABSTRACT

Treatment of subterranean formations using acid blends that contain alcohols and surfactants is described herein. The alcohols and surfactants are used together to retard the activity of acid on acid-susceptible species of rock formations.

15 Claims, 1 Drawing Sheet

(56) References Cited

U.S. PATENT DOCUMENTS

| | | |
|---|---|---|
| 9,809,716 B2 | 11/2017 | Beuterbaugh |
| 9,920,606 B2 | 3/2018 | Jiang |
| 10,035,944 B2 | 7/2018 | Purdy |
| 10,131,831 B2 | 11/2018 | Rimassa |
| 10,378,325 B2 | 8/2019 | Panga et al. |
| 10,703,957 B2 | 7/2020 | Al-Yami |
| 10,767,474 B2 | 9/2020 | Feng |
| 10,787,606 B2 | 9/2020 | Weider |
| 10,954,432 B2 | 3/2021 | Panga et al. |
| 10,982,133 B2 | 4/2021 | Purdy |
| 11,091,689 B2 | 8/2021 | Daeffler |
| 11,098,241 B2 | 8/2021 | Purdy |
| 11,168,244 B2 | 11/2021 | Phan |
| 2002/0023752 A1 | 2/2002 | Qu |
| 2002/0147114 A1 | 10/2002 | Dobson |
| 2004/0009880 A1 | 1/2004 | Fu |
| 2004/0129418 A1 | 7/2004 | Jee |
| 2005/0124500 A1 | 6/2005 | Chen |
| 2006/0042797 A1 | 3/2006 | Fredd |
| 2006/0102349 A1* | 5/2006 | Brady .................. C09K 8/52 507/923 |
| 2006/0180308 A1 | 8/2006 | Welton |
| 2007/0235189 A1 | 10/2007 | Milne |
| 2007/0293404 A1 | 12/2007 | Hutchins |
| 2008/0139412 A1 | 6/2008 | Fuller |
| 2008/0194430 A1* | 8/2008 | Welton .................. C09K 8/72 507/213 |
| 2008/0200353 A1 | 8/2008 | Dahayanake |
| 2008/0269081 A1* | 10/2008 | Lin ..................... C09K 8/68 507/209 |
| 2008/0289828 A1 | 11/2008 | Hutchins |
| 2008/0314594 A1 | 12/2008 | Still |
| 2009/0247431 A1 | 10/2009 | Gupta |
| 2010/0010106 A1 | 1/2010 | Crews |
| 2010/0022418 A1 | 1/2010 | Milne |
| 2010/0224365 A1 | 9/2010 | Abad |
| 2010/0243242 A1 | 9/2010 | Boney |
| 2010/0248996 A1 | 9/2010 | Sawdon |
| 2010/0331223 A1* | 12/2010 | Li ..................... C09K 8/602 507/203 |
| 2011/0036583 A1* | 2/2011 | Willberg ............. E21B 43/26 166/305.1 |
| 2012/0238479 A1 | 9/2012 | Choudhary |
| 2013/0025870 A1 | 1/2013 | Berry |
| 2013/0032345 A1 | 2/2013 | Freese |
| 2013/0261032 A1 | 10/2013 | Ladva |
| 2013/0327531 A1 | 12/2013 | Dahayanake |
| 2014/0116708 A1 | 5/2014 | Wadekar |
| 2014/0166291 A1 | 6/2014 | Friesen |
| 2014/0171345 A1 | 6/2014 | Steiner |
| 2014/0174742 A1 | 6/2014 | Mirakyan |
| 2014/0212006 A1 | 7/2014 | Zhao |
| 2014/0256604 A1 | 9/2014 | Wadekar |
| 2014/0329725 A1 | 11/2014 | Karale |
| 2014/0367100 A1 | 12/2014 | Oliveira |
| 2015/0034315 A1 | 2/2015 | Jiang |
| 2015/0034318 A1 | 2/2015 | Jiang |
| 2015/0080271 A1 | 3/2015 | De Wolf |
| 2015/0114647 A1 | 4/2015 | Jiang |
| 2015/0200147 A1 | 7/2015 | Lien |
| 2015/0240147 A1 | 8/2015 | Jiang |
| 2015/0260021 A1 | 9/2015 | Reyes |
| 2015/0322762 A1 | 11/2015 | Varadaraj |
| 2015/0344771 A1 | 12/2015 | Jiang |
| 2016/0024370 A1 | 1/2016 | Ba Geri |
| 2016/0025895 A1 | 1/2016 | Ziauddin |
| 2016/0146964 A1 | 5/2016 | Badri |
| 2016/0237340 A1 | 8/2016 | Pandya |
| 2016/0298024 A1 | 10/2016 | Panga et al. |
| 2017/0037304 A1* | 2/2017 | Rimassa ............. C09K 8/602 |
| 2017/0267918 A1 | 9/2017 | Daeffler |
| 2018/0244981 A1 | 8/2018 | Panga et al. |
| 2018/0244982 A1 | 8/2018 | Yakovlev |
| 2018/0273834 A1 | 9/2018 | Qiu |
| 2018/0282613 A1 | 10/2018 | Blackbourn |
| 2019/0010385 A1 | 1/2019 | Sayed |
| 2019/0194528 A1 | 6/2019 | Purdy |
| 2019/0292440 A1 | 9/2019 | Purdy |
| 2020/0224085 A1 | 7/2020 | Purdy |
| 2020/0224086 A1 | 7/2020 | Purdy |
| 2020/0270505 A1 | 8/2020 | Reddy |
| 2020/0318009 A1 | 10/2020 | Purdy |
| 2020/0399530 A1 | 12/2020 | Zakaria |
| 2021/0002543 A1 | 1/2021 | Jin |
| 2021/0130680 A1 | 5/2021 | Purdy |
| 2021/0189226 A1 | 6/2021 | Purdy |
| 2021/0198561 A1 | 7/2021 | Purdy |
| 2021/0253936 A1 | 8/2021 | Purdy |
| 2021/0277302 A1 | 9/2021 | Qiu |
| 2021/0380872 A1 | 12/2021 | Daeffler |
| 2023/0257645 A1 | 8/2023 | Daeffler |
| 2023/0279284 A1 | 9/2023 | Qiu |

FOREIGN PATENT DOCUMENTS

| | | |
|---|---|---|
| CN | 110564398 | 12/2019 |
| EP | 2524017 | 6/2015 |
| KR | 20200108408 | 9/2020 |
| RU | 2247833 | 3/2005 |
| WO | 2000019062 A1 | 4/2000 |
| WO | 03054352 | 7/2003 |
| WO | 2004005672 A1 | 1/2004 |
| WO | 2006136262 A1 | 12/2006 |
| WO | 2009077958 A1 | 6/2009 |
| WO | 2011148282 A1 | 12/2011 |
| WO | 2014193546 A1 | 12/2014 |
| WO | 2015020688 A1 | 2/2015 |
| WO | 2015154977 A1 | 10/2015 |
| WO | 2016105996 A1 | 6/2016 |
| WO | 2016164056 A1 | 10/2016 |
| WO | 2017040434 A1 | 3/2017 |
| WO | 2017040553 A1 | 3/2017 |
| WO | 2017040562 A1 | 3/2017 |
| WO | 2018018129 A1 | 2/2018 |
| WO | 2019245983 A1 | 12/2019 |
| WO | 2021126303 A1 | 6/2021 |
| WO | 2023283480 A1 | 1/2023 |
| WO | 2023287746 A1 | 1/2023 |
| WO | 2023049360 A1 | 3/2023 |
| WO | 2023102001 A1 | 6/2023 |
| WO | 2023183462 A1 | 9/2023 |
| WO | 2023183465 A1 | 9/2023 |

OTHER PUBLICATIONS

Buijse, "Understanding wormholing mechanisms can improve acid treatments in carbonate formations", SPE Production Facilities, vol. 15, No. 3, 2000, pp. 168-175.

Callahan et al., "Solvation of Magnesium Dication: Molecular Dynamics Simulation and Vibrational Spectroscopic Study of Magnesium Chloride in Aqueous Solution", J. Phys. Chem. A. 2010, 114, 5141-5148.

Chemicalland21, "Lauryl alcohol ethoxlates", http://www.chamicalland21.com/specialtychem/perchem/lauryl%20alcohol%20ethoxylate.htm, Jan. 17, 2015, 5 pages.

Crowe, C.W.; McGowan, G. R.; Baranet, S. E. "Investigation f Retarded Acids Provides Better Understanding of Their Effectiveness and Potential Benefits", SPE 18222, SPE Production Engineering, May 1990, pp. 166-170.

Edward et al., "the Dielectric Increments of Amino Acids", J. Am. Chem. Soc. 1974, 96, 902-906.

Fredd et al., "Influence of transport and reaction on wormhole formation in carbonate porous media", AIChE Journal, vol. 44, No. 9, Sep. 1998, pp. 1933-1949.

Ghommem et al., "Carbonate Acidizing: Modeling, Analysis, and Characterization of Wormhole Formation and Propagation", Journal of Petroleum Science and Engineering, vol. 131, Jul. 2015, pp. 18-33.

Liu et al., "Wormhole propagation behavior under reservoir condition in carbonate acidizing", Transport in porous Media, vol. 96, Issue 1, Jan. 2013, pp. 203-220.

(56) References Cited

OTHER PUBLICATIONS

Lungwitz, B.; Fredd, C.; Brady, M.; Miller, M.; Ali, S.; Hughes, K. "Diversion and Cleanup Studies of Viscoelastic Surfactant-Based Self-Diverting Acid", SPE 86504, SPE International Symposium and Exhibition on Formation Damage Control, Feb. 18-20, 2004, 10 pages.
Mou, J.; Liu, M.; Zheng, K.; Zhang, S. "Diversion Conditions for Viscoelastic-Surfactant-Based Self-Diversion Acid in Carbonate Acidizing" SPE 173898, May 2015, SPE Production Operations, pp. 121-129.
P. M. J Tardy, B. Lecerf, Y. Christanti "An Experimentally Validated Wormhole Model for Self-Diverting and Conventional Acids in Carbonate Rocks Under Radial Flow Conditions" paper SPE 107854, presented at the European Formation Damage Conference held in Scheveningen, The Netherlands, May 30-Jun. 1, 2007; 17 pages.
Panga et al., "Two-Scale Continuum Model for Simulation of Wormholes in Carbonate Acidization", AICHE J. 2005, 51, 3231-3248.
Petrov et al., "An Integrated approach to the treatment of the bottom-hole zone of the formation as a method for intensification of production", Scientific and technical journal Georesources, No. 1,(33), 2010, pp. 7-10.
Scherubel, G. A; Crowe, C. W. "Foamed Acid, A New Concept in Fracture Acidizing" paper SPE 7568, presented at the Annual Fall Technical Conference and Exhibition, Houston, TX, USA, Oct. 1978, 8 pages.
Travalani-Louvisse, A.M. et al., "The use of ethanol in oil well stimulation fluids", Journal of Petroleum Science and Engineering, 1990, 4(3), pp. 257-272.
Wyman, "Dielectric Constant: Ethanol-Diethyl Ether and Urea-Water Solutions between 0 and 50", J. Am. Chem. Soc. 1933, 55, 4116-4121.
Xu et al., "On the Origin of Proton Mobility Suppression in Aqueous Solutions in Amphiphiles", J. Phys. Chem. B. 2013, 117, 15426-15435.
Examination Report issued in GCC Patent Appl. No. GC 2016-31138 on Jul. 17, 2018; 4 pages.
International Search Report issued in PCT Application PCT/US2016/025967 on Jul. 14, 2016; 3 pages.
Written Opinion issued in PCT Application PCT/US2016/025967 on Jul. 14, 2016; 3 pages.
Office Action issued in U.S. Appl. No. 18/305,765 dated Dec. 21, 2023, 18 pages.
International Search Report and Written Opinion issued in International Patent Appl. No. PCT/US2016/049335 on Nov. 17, 2016; 9 pages.
PCT International Preliminary Report on Patentability; Application No. PCT/US2016/049335; Dated Mar. 15, 2018; 8 pages.
Eurasian Office Action issued in Eurasian Patent Application No. 201890638 on Oct. 2, 2018; 6 pages (with English Translation).
Examination Report issued in related GC Application GC 2016-39640 on Jul. 8, 2021; 5 pages.
Examination Report issued in the related GC Application GC/2016/31967 dated Nov. 20, 2018 (4 pages).
Third Examination Report issued in the related GC Application GC/2016/31967 dated Feb. 17, 2021, 4 pages.
Eurasian Office Action issued in Eurasian Patent Application No. 201890637 Mar. 27, 2019; 12 pages (with English Translation).
Examination Report issued in the related GC Application GC/2016/31966 dated Nov. 26, 2018 (4 pages).
International Search Report and Written Opinion issued in International Patent Application No. PCT/US2016/049538 on Nov. 10, 2016; 10 pages.
International Preliminary Report on Patentability issued in International Patent Application No. PCT/US2018/024439 on Oct. 10, 2019; 11 pages.
Extended European Search Report issued in European Patent Appl. No. 18776307.3 on Dec. 10, 2020; 9 pages.
Exam Report Issued in Qatar Patent Application No. QA/201909/000510 dated Oct. 29, 2023, 5 pages with English translation.
Office Action issued in Kazakhstan Patent Appl. No. 2019/0788.1 on Nov. 2, 2020; 15 pages (with English translation).
International Search Report and Written Opinion issued in International Patent Appl. No. PCT/US2018/024439 on Jul. 12, 2018; 14 pages.
Substantive Exam issued in Saudi Arabian Patent Application No. 519410203 dated May 24, 2022, 10 pages with English translation.
International Search Report and Writtin Opinion issued in the PCT Application No. PCT/US2022/036641 dated Nov. 4, 2022, 13 pages.
Office Action issued in U.S. Appl. No. 18/689,334 dated Aug. 30, 2024, 10 pages.
Office Action issued in U.S. Appl. No. 18/689,334 dated Jul. 25, 2024, 24 pages.
Search Report and Written Opinion of International Patent Application No. PCT/US2022/044553 dated Jan. 18, 2023, 6 pages.
Search Report and Written Opinion of International Patent Application No. PCT/US2022/051322 dated Apr. 14, 2023, 7 pages.
Search Report and Written Opinion of International Patent Application No. PCT/US2023/016026 dated Jul. 7, 2023, 8 pages.
Search Report and Written Opinion of International Patent Application No. PCT/US2023/016032 dated Jul. 18, 2023, 9 pages.
Office Action issued in U.S. Appl. No. 18/691,989 dated Oct. 11, 2024, 22 pages.

* cited by examiner

SINGLE-PHASE ALCOHOL-BASED RETARDED ACID

CROSS-REFERENCE TO RELATED APPLICATIONS

This application is a National Stage and claims benefit of PCT Patent Application No. PCT/US2022/036641, entitled "Single-Phase Alcohol-Based Retarded Acid," filed on Jul. 11, 2022, which claims the benefit of U.S. Provisional Application No. 63/219,970 entitled "Single-Phase Alcohol-Based Retarded Acid," filed Jul. 9, 2021, and U.S. Provisional Application No. 63/222,243, filed Jul. 15, 2021, the disclosures of which are incorporated by reference in their entirety.

FIELD

This patent application describes methods and apparatus for stimulating hydrocarbon reservoirs. Specifically, methods and materials for acid treating hydrocarbon formations is described.

BACKGROUND

Almost two-thirds of the world's remaining oil reserves are contained in carbonate reservoirs. Carbonate formations have a tendency to be highly heterogeneous, with complex porosity and permeability variations, barriers, and irregular flow paths. In order to increase the productivity of wells in a calcareous formation, a range of stimulation techniques can be applied. One of the most common techniques involves the stimulation of the well with acids.

Acids can be injected into the formation to boost production or increase injectivity in oil and gas fields. Stimulation of carbonate rocks typically involves the reaction between an acid and the minerals calcite ($CaCO_3$) and dolomite [$CaMg(CO_3)_2$] to enhance the flow properties of the rock. The two main stimulation methods are acid fracturing and matrix acidizing.

Acid fracturing involves the pumping of a viscous pad at injection rates that result in pressures above the fracture pressure to fracture the rock. Once fractures have been created, an acid stage is pumped to etch and form pathways at and near the fracture surfaces. After the treatment, the fracture closes but the pathways—intricate, high-permeability channels—persist, which allows for an increased conductivity between the formation and the well to remain.

Matrix acidizing, in contrast, is performed at injection rates that result in pressures below the fracture pressure. Acids, solvents, and/or other chemical treatments are pumped into the formation. When acids penetrate into the carbonate formation, some of the minerals in the rock dissolve creating highly conductive channels (wormholes).

In carbonate reservoirs, hydrochloric acid (HCl) is the most commonly applied stimulation fluid. Organic acids such as formic and acetic acid are used in retarded-acid systems or in high-temperature applications. However, these systems have several limitations. In the case of organic acids, the dissolution of the rock is low when compared to that of HCl, so larger volumes are required to dissolve the same amount of rock. Hydrochloric acid, on the other hand, has a high reaction rate at higher temperatures, meaning that the acid will not penetrate deep into the formation before it is fully spent. To solve these issues, an emulsified acid (acid-in-oil) with a high dissolution capacity and low reaction rates was developed. This fluid system raised other problems such as high friction pressures which limit the pumping rates, health, safety and environmental (HSE) issues due to the use of highly flammable substances (diesel, crude), and quality concerns during the preparation of the emulsion.

Improved retarded acid systems are needed for stimulation of carbonate reservoirs.

SUMMARY

Embodiments described herein provide a method of stimulating a hydrocarbon reservoir by preparing an aqueous mixture comprising a strong acid, an alcohol, and a surfactant; and flowing the aqueous mixture into the hydrocarbon reservoir.

Other embodiments described herein provide a single-phase acid treatment composition, comprising a strong acid, an alcohol, and a betaine-based surfactant.

Other embodiments described herein provide a method of treating a hydrocarbon reservoir, the method comprising obtaining a single-phase aqueous mixture consisting of water-miscible components, the mixture comprising a strong acid, an alcohol, and a betaine-based surfactant or an alkyl ammonium bromide surfactant; and flowing the aqueous mixture into the hydrocarbon reservoir.

DETAILED DESCRIPTION

Figure 1:
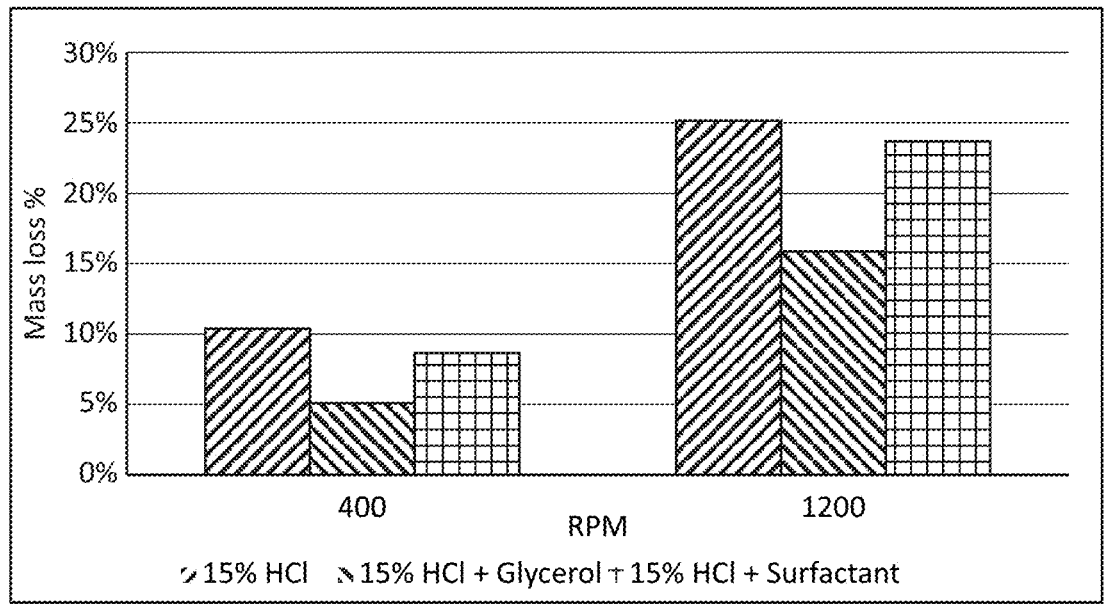
FIG. 1 is a graph illustrating results of dynamic tests of three different fluids.

Blending a strong acid with an alcohol and a surfactant has been found to yield an acid system with reduced reactivity rate that is useful for acid treating acid-susceptible hydrocarbon reservoirs. The alcohol and the surfactant is added to the acid system and mixed vigorously to homogenize the mixture. The mixture thus formed consists of water-miscible components, and is a single liquid phase. The alcohol is generally an organic molecule with one or more hydroxyl groups. Alcohols with one, two, three, four, five, or six hydroxyl groups, or more, can be used. Molecular weight and hydroxyl number of the alcohol can be selected to provide a target density and/or viscosity. Examples of alcohols that can be used include methanol, isopropanol, ethylene glycol, glycerol, pentaerythritol, and sorbitol. Any alcohol with suitable molecular weight and viscosity for a particular application can be used. Usable alcohols may be aromatic or aliphatic, to any degree. Fused and/or polynuclear aromatic molecules having hydroxyl groups can be used. Linear, branched, cyclic, or multi-cyclic alcohols can be used. Alcohol polymers, for example polyvinyl alcohol, can be used with selected molecular weight, branching, aromaticity, and hydroxyl number. Combinations of alcohols can also be used to tune the acid-retarding features, fluid properties, and/or other features of the mixture. Species such as esters and ethers that can hydrolyze to yield alcohols can be used, alone or in combination with alcohols. For example, an alcohol can be used with the corresponding acetate ester in a retarded acid drilling fluid. Hydrolysis of the ester yields the conjugate alcohol and acetic acid, which can have acid treatment utility. In this way, hydrolyzable species can serve as time-delayed acids and acid-retardant species in some cases.

The types of alcohols that are used are those which are generally unreactive or minimally reactive with strong hydroacids, where in this context a hydroacid is an acidic compound of hydrogen with an anion. Alcohols that accept protons to form relatively stable cations at low pH can react to form stable compounds by eliminating water, thus removing acid from the mixture. Such alcohols generally include those where a hydroxyl group is alpha to a stabilizing structure, such as a tertiary carbon atom (no hydrogen atoms bonded to the carbon atom) or beta secondary carbon atom (one hydrogen atom bonded to the carbon atom). Thus, where an alcohol includes a tertiary carbon or a beta secondary carbon, and the oxygen atom of the hydroxyl group is bonded to the tertiary carbon, the alcohol can be expected to react, under some circumstances, with the acid to eliminate water. These reactions generally have an equilibrium characteristic, so the amount of acid consumed by reaction with the alcohol, and the amount of alkyl halide produced, is defined by the equilibrium. The equilibrium thus affects the amount of acid in the mixture, which can also retard acid function in the formation. Reagents, for example containing or dissociating to common or similar ions, can also be added to affect the equilibrium. For example in one case, a catalytic amount of a more nucleophilic halide, such as bromide or iodide, can be added to return some chloride ions to solution. Where iodide is used, iodide salts may be produced that can also act as corrosion inhibitors.

Alcohols are believed to retard acid reactions in acid-susceptible formations by reducing the rate at which acid species come into contact with acid-susceptible species in the rock formation. Alcohols that do not react, or react minimally, with acid species can thus be used without limitation. Alcohols that react with acid species under some circumstances can also be used in conditions that tend to reduce the rate of reaction of alcohol with acid species. For example, if an alcohol might be expected to react with HCl at relatively high temperature, that alcohol may be used as an acid retarding reagent if formation temperatures do not approach a reaction temperature of the alcohol with the acid. Species mobility can also be reduced by some alcohols that might react with acid species. For example, where an alcohol increases viscosity and thus reduces mobility of aqueous species, rate of alcohol-acid reactions can be reduced. The acid treatment mixture can also be cooled to reduce any unwanted side-reactions, and to further delay acid activity by adjusting mixture viscosity and/or kinetic characteristics.

Acids that can be used for the treatment fluid compositions herein strong acid molecules such as hydrogen chloride (HCl, also called hydrochloric acid, hydrogen bromide in water (HBr, also called hydrobromic acid), hydrogen iodide (HI, also called hydroiodic acid), hydrogen fluoride in water (HF, also called hydrofluoric acid), sulfuric acid ($H_2SO_4$), nitric acid ($HNO_3$), phosphoric acid ($H_3PO_4$), an alkanesulfonic acid ($RSO_3H$, where R is an alkyl group), an arylsulfonic acid ($ArSO_3$, where Ar is an aromatic or aryl group), or a combination thereof in water solution. The fluids described herein are retarded acid fluids that can be used to penetrate acid-susceptible formations for acid treatment, and provide flowback compositions that are less corrosive than conventional treatment fluids. For example, where conventional treatment fluids generally result in flowback at pH of 0 to 3, the retarded acid fluids described herein generally provide flowback composition of pH from about 3 to about 5.5, resulting in reduced flowback time.

To the extent some alcohol reacts with acid, perhaps at slow rates, stoichiometrically excess acid can be provided to avoid loss of too much acid while retaining the retarding properties of the alcohol and any byproducts of reaction between alcohol and acid. For example, glycerol reacts relatively slowly with HCl to form small quantities of 3-chloropropane-1,2-diol, which is less viscous than glycerol but can still provide a dilution effect to retard acid reactivity. HF, and simple organic acids such as formic acid and acetic acid, which are also commonly used for acid treatment, are generally less reactive with alcohols than HCl, so where such acids are used with HCl, they are generally expected to react much less, or not at all, with any of the alcohols described herein.

Surfactants are also used in alcohol-acid blends to enhance acid retardation. Surfactants generally occupy sites where acid might react with acid-susceptible species in rock formations. Any surfactant that has affinity for acid-susceptible species in rock formations can be used. Such surfactants may be amphoteric, nonionic, cationic, or anionic. Surfactants that can be used include, but are not limited to, betaine-based materials such as erucic amidopropyl dimethyl betaine and cocamidopropyl betaine; alkyl ammonium bromide materials such as hexadecyltrimethyl ammonium bromide and tetradecyltrimethyl ammonium bromide; and dodecylbenzene sulfonic acid. Combinations of surfactants can be used to tune the effect of acid and alcohol on the acid-susceptible species of the rock formation. The surfactant, or combination of surfactants, is generally added to a mixture of acid and alcohol to complete a single-phase treatment mixture.

Other components can be added to the single-phase acid mixtures described above for use in acid treatment of hydrocarbon formations. Such components include corrosion inhibitors, friction reducers, scale inhibitors, biocides, surfactants, $H_2S$ scavengers, iron control reagents, diversion agents, viscosifiers, chelating reagents, solvents, clay stabilizers, and calcium inhibitors. These reagents can be added to the mixture neat or dissolved in water or another compatible solvent. For example, such reagents can be added to an alcohol to form a premix, and the premix can then be added to an acid solution to form a single-phase treatment mixture.

The single-phase aqueous mixtures described above can be used as acid treatment compositions with no further additional components, and can be used in a single-step acid treatment process, wherein the single-phase aqueous mixture consisting of water-miscible components and comprising a strong acid, an alcohol, and a surfactant is pumped into a well to acidify the interior of a hydrocarbon formation adjacent to the well. Additional components can be added to the single-phase aqueous mixture to enhance the properties and performance thereof. Adding these components may results in a multi-phase mixture in some cases, or the mixture may remain single-phase after the additional components are added. Acid treatment mixtures described herein may also be used in multi-step processes that might include pre-treatment operations to flush the formation with flush compositions that may be liquid, gas, or a mixture thereof, and may be aqueous, oleaginous, or a mixture thereof. In some instances a dilute acid flush may be used prior to acid treatment to remove any unwanted components from the formation prior to acid treatment.

EXAMPLES

To evaluate the retardation effects provided to the reaction between HCl and calcite, rotating disk experiments (RDEs), which serve to study the interplay between transport and reaction under defined conditions, were conducted at room temperature. Three fluids were tested: unmodified 15% HCl, 15% HCl with 20% glycerol, and 15% HCl with 1% surfactant (erucic amidopropyl dimethyl betaine). FIG. 1 is a graph showing the results of the dynamic tests. As shown in FIG. 1, the surfactant on its own does not significantly slow down the rate of dissolution of the rock by HCl. Glycerol, on the other hand, reduces dissolution of the rock by half under the same test conditions.

Mass loss experiments were conducted to test the performance of various surfactants with glycerol. The control fluid (labeled HCl) only contains 15% HCl whereas the rest contain 15% HCl and 20% glycerol as a retarding agent. The retardation package is then completed with the addition of a surfactant. The surfactants tested are erucic amidopropyl dimethyl betaine (EADB), cocamidopropyl betaine (CB), hexadecyltrimethyl ammonium bromide (CTAB), and dodecylbenzene sulfonic acid (DBS). EADB and CB were both added at a concentration of 10% whereas CTAB and DBS were added at a concentration of 0.4 g/100 mL fluid. The materials dissolved were marble cores 1" in diameter× 0.5" in thickness.

Figure 2:
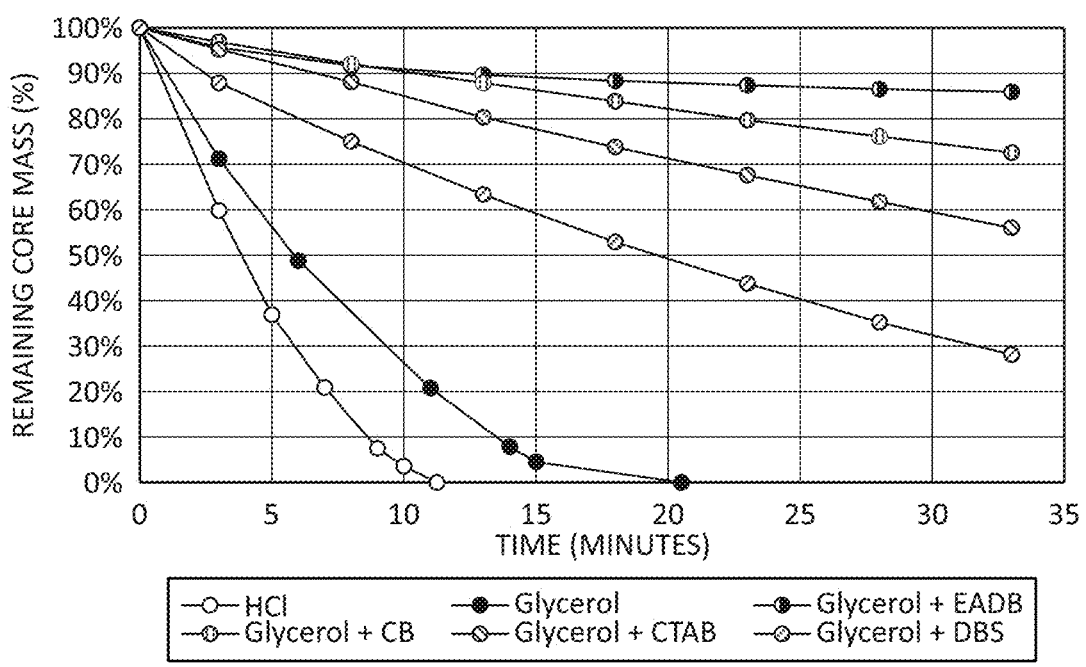
FIG. 2 is a graph illustrating results of mass loss experiments testing performance of various surfactants with glycerol.

FIG. 2 is a graph showing the results of the tests. As seen in FIG. 2, glycerol on its own retards the reaction of HCl with the marble. However, the addition of the other component of the retardation package, the surfactant, greatly improves the rate of retardation. The core in the control fluid dissolved fully after close to 12 minutes, whereas that in glycerol took almost twice as long to fully dissolve. The cores in fluids with glycerol and a surfactant reacted much slower, with EADB interfering with the reaction the most and DBS the least.

The dynamic test results of FIG. 1 and the static test results of FIG. 2 both show a clear performance advantage of a single-phase aqueous mixture consisting of water-miscible components and comprising a strong acid, an alcohol, and a surfactant over use of acid alone or acid and surfactant alone. Interaction of the acid with acid-susceptible species in the rock is slowed, allowing time for the mixture to flow deeper into the formation to improve permeability deep into the formation.

The treatment fluids described herein can be used as a foamed material. A foaming agent, which can also be a surfactant or a co-surfactant, can be included and a gas introduced to form a foam. The foam can be pumped into the subterranean formation to apply retarded acid compositions to the formation. Foaming reduces the amount of acid, retardant, and other agents that must be used to treat the formation.

The methods described herein can be used to treat subterranean formations having acid susceptible structures, such as carbonate formations. Subterranean formations such as hydrocarbon reservoirs and injection reservoirs having acid-susceptible formations can be treated using the compositions described herein. The retarded acid treatment fluids described herein use an alcohol and a surfactant to slow reaction of a strong acid with the acid-susceptible structures, allowing the treatment fluid to retain its activity longer as the fluid is flowed into the formation to reach a target location.

While the foregoing is directed to embodiments of the present invention, other and further embodiments of the present disclosure may be devised without departing from the basic scope thereof, and the scope thereof is determined by the claims that follow.

We claim:

1. A method of treating a subterranean formation, the method comprising:
preparing a single-phase aqueous mixture consisting of HCl, glycerol, and a betaine-based surfactant, wherein a concentration of the glycerol in the single-phase aqueous mixture is greater than a concentration of the betaine-based surfactant in the single-phase aqueous mixture, wherein the HCl and the glycerol react to form 3-chloropropane-1,2-diol, and wherein the 3-chloropropane-1,2-diol is configured to retard activity of the HCl; and
flowing the single-phase aqueous mixture into the subterranean formation.

2. The method of claim 1, wherein the betaine-based surfactant is a cationic surfactant.

3. The method of claim 1, further comprising adding to the single-phase aqueous mixture one or more components selected from the group consisting of corrosion inhibitors, friction reducers, scale inhibitors, biocides, surfactants, $H_2S$ scavengers, iron control reagents, diversion agents, viscosifiers, chelating reagents, solvents, clay stabilizers, and calcium inhibitors.

4. The method of claim 1, wherein the subterranean formation is a hydrocarbon reservoir having carbonate structures.

5. The method of claim 1, wherein the HCl is present in the single-phase aqueous mixture in stoichiometric excess.

6. The method of claim 1, further comprising adding to the single-phase aqueous mixture a catalytic amount of bromide or iodide.

7. A single-phase acid treatment composition consisting of HCl, glycerol, and a betaine-based surfactant, wherein a concentration of the glycerol in the single-phase acid treatment composition is greater than a concentration of the betaine-based surfactant in the single phase acid treatment composition, wherein the HCl and the glycerol react to form 3-chloropropane-1,2-diol, wherein the 3-chloropropane-1,2-diol is configured to retard activity of the HCl, and wherein the single-phase acid treatment composition is disposed in a subterranean formation.

8. The single-phase acid treatment composition of claim 7, wherein the betaine-based surfactant is a cationic surfactant.

9. The single-phase acid treatment composition of claim 7, wherein the HCl is present in stoichiometric excess.

10. The single-phase acid treatment composition of claim 7, wherein the surfactant is erucic amidopropyl dimethyl betaine.

11. A method of treating a hydrocarbon reservoir, the method comprising:
obtaining a single-phase aqueous mixture consisting of HCl, glycerol, and a betaine-based surfactant, wherein a concentration of the glycerol in the single-phase aqueous mixture is greater than a concentration of the betaine-based surfactant in the single-phase aqueous mixture, wherein the HCl and the glycerol react to form 3-chloropropane-1,2-diol, and wherein the 3-chloropropane-1,2-diol is configured to retard activity of the HCl; and
flowing the single-phase aqueous mixture into the hydrocarbon reservoir.

12. The method of claim 11, wherein the HCl is present in stoichiometric excess.

13. The method of claim 11, wherein the hydrocarbon reservoir comprises a carbonate formation.

14. The method of claim 11, wherein the single-phase aqueous mixture further consists of a catalytic amount of bromide or iodide.

15. The single-phase acid treatment composition of claim 7, wherein the concentration of the betaine-based surfactant in the single phase acid treatment composition is less than a concentration of the HCl in the single phase acid treatment composition.

* * * * *